3,513,103
FLUORESCENT PHOSPHOR

Francis N. Shaffer, Towanda, Pa., assignor to Sylvania Electric Products Inc., a corporation of Delaware
No Drawing. Filed Dec. 12, 1967, Ser. No. 689,817
Int. Cl. B09k 1/06, 1/36
U.S. Cl. 252—301.4      6 Claims

ABSTRACT OF THE DISCLOSURE

An alkaline earth metal halophosphate phosphor activated by europium and manganese in which the alkaline earth metal is preferably calcium and/or strontium and the halogen is preferably chlorine and/or bromine. Such phosphors can be excited by ultraviolet light at both 2537 and 3650 A., thereby making them suitable luminescent materials in both fluorescent and high pressure mercury lamps.

BACKGROUND OF THE INVENTION

Field of the invention

This invention relates to fluorescent phosphors and to improving the characteristics of such phosphors.

Description of the prior art

In the past, europium has been used to activate alkaline earth metal phosphate hosts. Moreover, alkaline earth metal halophosphates have been disclosed in the art and have been successfully employed as phosphors in fluorescent lamps.

Manganese activated alkaline earth halophosphate phosphors normally emit only in the orange-red region of the spectrum. In addition, they are usually excited only by cathode rays, and are fairly inert to ultraviolet light.

SUMMARY OF THE INVENTION

I have found that when divalent europium is also added as an activator, the phosphor is, unexpectedly, excitable by ultraviolet light. Furthermore, the emission, instead of being limited to orange-red, can be varied from blue through a range of white to orange by varying the ratios of cations of the matrix and the activators.

The phosphor of the present invention is formed of a matrix of the calcium and/or strontium orthophosphate which contains chloride and/or bromine atoms. The activator is divalent europium and manganese. Relative quantities of the composition should be controlled and the anions should be substantially stoichiometric with regard to the cations to form an apatite crystal structure. The proportions of the calcium and/or strontium may be arranged so that all strontium or all calcium is present or ratios of each are present. Similar proportions may be used with the chlorine or bromine.

Such phosphors may be disposed on the inner surfaces of fluorescent lamp envelopes wherein they can be excited by a low pressure mercury discharge principally at 2540 A. They may also be disposed upon the bulbous envelope of a mercury lamp wherein they can be excited by a high pressure mercury discharge principally at 3650 A.

Under 2540 A. excitation, a europium-activated, strontium chlorophosphate phosphor emits in the blue and there is no substantial red emission. When quantities of manganese are added to this matrix, the blue emission is diminished somewhat and a peak in the red region appears. Substantial red emission is attained when the concentration of europium is between about 0.005 to 0.5 gram atoms per 6 moles of $PO_4$ and the manganese concentration is between about 0.1 to 1.0 gram atoms per 6 moles of $PO_4$.

In the table following, various phosphor formulations within the scope of the present invention are described. The red, blue and green brightnesses are segregated and compared to an arbitrary standard of strontium chlorophosphate activated by europium and manganese. The red, blue and green brightnesses of the standard were each equated to 100% and the brightnesses of the test samples were compared on a relative basis.

In each phosphor sample, there were 0.15 gram atoms of divalent europium and 0.75 gram atoms of manganese so that a stoichiometric balance was obtained.

TABLE

| Phosphor | 2537 A. Excitation | | |
|---|---|---|---|
| | R | G | B |
| $Ca_{9.1}Cl_2(PO_4)_6$:Eu, Mn | 90 | 43 | 39 |
| $Sr_{9.1}Cl_2(PO_4)_6$:Eu, Mn | 102 | 97 | 63 |
| $Ca_{7.58}Sr_{1.52}Cl_2(PO_4)_6$:Eu, Mn | 163 | 72 | 92 |
| $Ca_{6.82}Sr_{2.28}Cl_2(PO_4)_6$:Eu, Mn | 159 | 120 | 68 |
| $Ca_{4.55}Sr_{4.55}Cl_2(PO_4)_6$:Eu, Mn | 132 | 79 | 55 |
| $Ca_{2.28}Sr_{6.82}Cl_2(PO_4)_6$:Eu, Mn | 109 | 81 | 38 |
| $Ca_{1.52}Sr_{7.58}Cl_2(PO_4)_6$:Eu, Mn | 93 | 87 | 42 |
| $Ca_{9.1}Br_2(PO_4)_6$:Eu, Mn | 68 | 51 | 26 |
| $Sr_{9.1}Br_2(PO_4)_6$:Eu, Mn | 104 | 50 | 93 |
| $Ca_{7.58}Sr_{1.52}Br_2(PO_4)_6$:Eu, Mn | 72 | 37 | 69 |
| $Ca_{6.82}Sr_{2.28}Br_2(PO_4)_6$:Eu, Mn | 73 | 40 | 77 |
| $Ca_{4.55}Sr_{4.55}Br_2(PO_4)_6$:Eu, Mn | 45 | 100 | 208 |
| $Ca_{2.28}Sr_{6.82}Br_2(PO_4)_6$:Eu, Mn | 91 | 99 | 166 |
| $Ca_{1.52}Sr_{7.58}Br_2(PO_4)_6$:Eu, Mn | 95 | 91 | 148 |
| $Ca_{9.1}Cl_1Br_1(PO_4)_6$:Eu, Mn | 26 | 11 | 10 |
| $Sr_{9.1}Cl_1Br_1(PO_4)_6$:Eu, Mn | 100 | 82 | 117 |
| $Ca_{7.58}Sr_{1.52}Cl_1Br_1(PO_4)_6$:Eu, Mn | 64 | 38 | 65 |
| $Ca_{6.82}Sr_{2.28}Cl_1Br_1(PO_4)_6$:Eu, Mn | 54 | 34 | 62 |
| $Ca_{4.55}Sr_{4.55}Cl_1Br_1(PO_4)_6$:Eu, Mn | 61 | 65 | 101 |
| $Ca_{2.28}Sr_{6.82}Cl_1Br_1(PO_4)_6$:Eu, Mn | 97 | 82 | 80 |
| $Ca_{1.52}Sr_{7.58}Cl_1Br_1(PO_4)_6$:Eu, Mn | 109 | 93 | 81 |

When these phosphors were excited by 3650 A., similar values were obtained.

DESCRIPTION OF THE PREFERRED EMBODIMENTS

Ingredients for the desired composition were intimately blended by mortaring and were then fired in nitrogen or air to form the matrix. The material, after cooling in the firing atmosphere, was broken up by mortaring and was then fired for a second time in a controlled mixture of nitrogen and hydrogen to reduce the europium to the divalent state. It was then cooled to about 600° C. in the firing atmosphere before exposing to air. A firing temperature in the order of 950° C. for both firing steps appear to be about optimum for the Sr-Eu-Mn apatite preparations for optimum phosphor brightness and soft texture. Firing temperatures in the order of 1150° C. or higher for both firing steps appear to be desirable for optimum Ca-Eu-Mn apatite phosphors. Hydrogen-nitrogen mixtures containing about 3% hydrogen were found to be satisfactory for reducing the europium.

EXAMPLE I

One of the preferred compositions is as follows:

| | G. |
|---|---|
| $SrHPO_4$ (assay 99.1%) 6.00 g. mol | 1100 |
| $SrCO_3$ (theoretical) 3.38 g. mol | 500 |
| Mn as $MnCO_3$ (assay 43.8%) 0.50 g. mol | 63 |
| $Eu_2O_3$ (theoretical) 0.06 g. mol | 21 |
| $NH_4Cl$ (theoretical) 2.20 g. mol | 118 |

The materials were blended by mortaring, then passed through a Micropulverizer and again blended to render the mixture as homogeneous as possible.

A portion of the material was charged into three 6 inch long by 3 inch wide by 2 inch deep silica boats, covered and fired for one hour at 950° C. in a 4 inch diameter tube furnace through which a constant flow of 23 l.p.m. of nitrogen was maintained during the firing and cooling steps. The material was then cooled for one hour at the cool end of the furnace tube before it was removed to air to cool to room temperature. It was then mortared and passed through a 60 mesh sieve. The material had a white body color and showed a fair degree of luminescence under UV excitation. The sifted 60 mesh material was then charged into two silica boats and fired, while covered, for two hours at 950° C. in a tube furnace. A constant flow of 23 l.p.m. of nitrogen and 0.75 l.p.m. of hydrogen was maintained during the firing and cooling steps. The material was cooled for about two hours at the cool end of the furnace tube and then removed from the furnace to cool to room temperature. It was then mortared and passed through a 200 mesh sieve. The resultant phosphor emitted a blue-white color upon excitation with 2537 A. ultraviolet light. Another composition is shown in Example II.

EXAMPLE II

| | G. | |
|---|---|---|
| $CaHPO_4$ (assay 99%) 5.00 g. mol ratio | | 6.85 |
| $CaCO_3$ (theoretical) 3.88 g. mol ratio | | 3.88 |
| $MnNH_4PO_4$ (assay 92%) 1.00 g. mol ratio | | 1.83 |
| $Eu_2O_3$ (theoretical) 0.06 g. mol ratio | | 0.21 |
| $NH_4Cl$ (theoretical) 2.00 g. mol ratio | | 1.07 |

The material was blended by mortaring. A portion of the mixture was fired in a covered silica boat in a Burrell tube furnace in a nitrogen atmosphere at 1150° C. for one hour. The material was then cooled for one hour at the cool end of the furnace tube in nitrogen, then cooled in air and mortared. After sifting, the material was fired in the Burrell tube furnace in a 97% $N_2$-3% $H_2$ atmosphere at 1150° C. for one hour. The material was then cooled for ½ hour at the cool end of the furnace tube in the $N_2$ and $H_2$ atmosphere and then removed to cool in air. It was then mortared. The phosphor emitted in blue-red color upon excitation with 2537 A. light.

It is apparent that modifications and changes can be made within the spirit and scope of the present invention, but it is my intention, however only to be limited by the scope of the following claims.

As my invention, I claim:

1. An alkaline earth metal halophosphate phosphor activated by divalent europium and manganese.

2. The phosphor according to claim 1 wherein the alkaline earth metal is at least one member from the group consisting of calcium and strontium.

3. The phosphor according to claim 1 wherein the halogen is at least one member from the group consisting of chlorine and bromine.

4. The phosphor according to claim 1 wherein the alkaline earth metal is at least one member from the group consisting of calcium and strontium and the halogen is at least one member from the group consisting of chlorine and bromine.

5. The phosphor according to claim 1 wherein the manganese is in sufficient quantities to introduce a near red emission band into the emission of said phosphor.

6. The phosphor according to claim 5 wherein the europium concentration is about 0.005 to 0.5 gram atoms per 6 moles of $PO_4$ and the manganese concentration is about 0.1 to 1.0 gram atoms per 6 moles of $PO_4$.

References Cited

UNITED STATES PATENTS 3,014,874   12/1961   Ranby.
3,430,090   2/1969   Vodoklys et al.

TOBIAS E. LEVOW, Primary Examiner

R. D. EDMONDS, Assistant Examiner